Oct. 3, 1933.  J. E. MacDONALD  1,929,073

FURNACE WALL

Filed Nov. 21, 1930

INVENTOR
James E. MacDonald,
By Archworth Martin,
Attorney.

Patented Oct. 3, 1933

1,929,073

UNITED STATES PATENT OFFICE 1,929,073

FURNACE WALL

James E. MacDonald, Pittsburgh, Pa., assignor of one-half to Frank B. Pope, Pittsburgh, Pa.

Application November 21, 1930
Serial No. 497,247

2 Claims. (Cl. 110—1)

My invention relates to furnace walls, and is especially suitable for bulkhead walls of open hearth furnaces, although it is susceptible of use in various other ways.

The bulkhead walls of open hearth furnaces are short-lived compared to the other walls thereof, particularly if the bulkhead walls be not made of a very expensive material as compared to the material of the other walls. Furnace walls, including the bulkhead walls, are commonly made of silica brick, with the result that the bulkhead walls have to be repeatedly repaired and replaced during the life of the furnace. While chrome bricks have been employed in the making of bulkhead walls, they are very expensive and furthermore are of very great weight compared to the silica brick. Not only is the chrome bulkhead expensive, but its weight is such that when the middle portion thereof burns away, the weight above such portion tends to cause the wall to bulge out and collapse, besides exerting a crushing effect on the remaining inner section of the bulkhead.

One object of my invention is to provide a bulkhead wall of improved structure which will last appproximately as long as the other walls of the furnace, and which is not nearly so expensive as a wall made of chrome.

Another object of my invention is to provide a wall that is more resistant to acids than are various furnace walls of previously-known compositions.

Another object of my invention is to provide a furnace wall of generally simplified and improved form.

Figure 1:
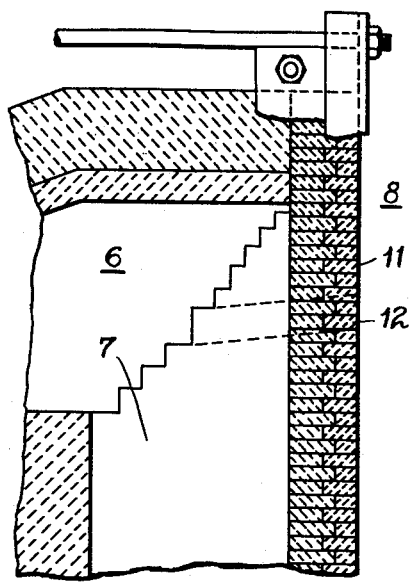
Figure 2:
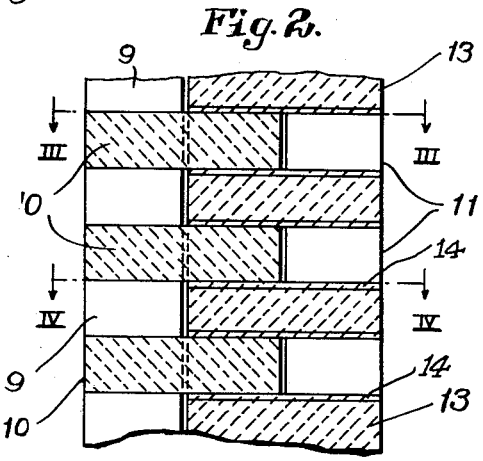
Figure 3:
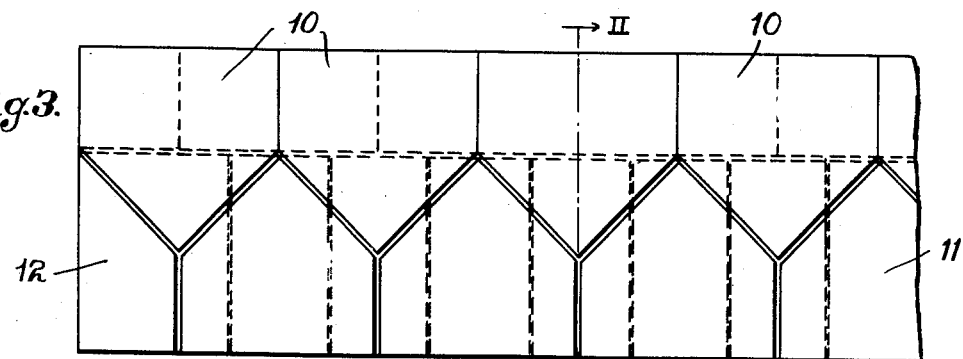
Figure 4:
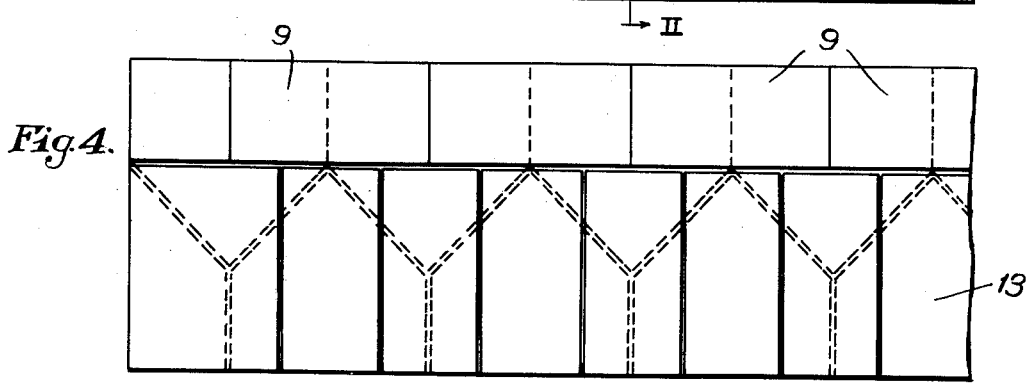
Figure 5:
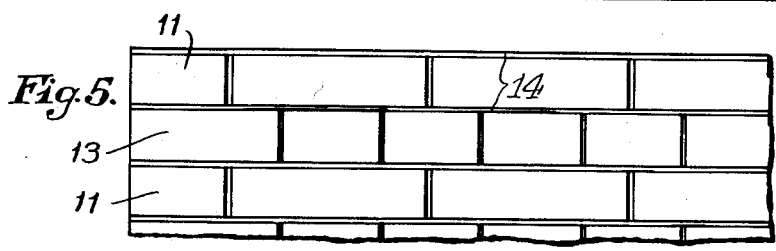

One manner in which my invention may be practised is shown in the accompanying drawing wherein Figure 1 is a vertical sectional view through a portion of a furnace; Fig. 2 is a view taken on the line II—II of Fig. 3; Fig. 3 is a view taken on the line III—III of Fig. 2; Fig. 4 is a view taken on the line IV—IV of Fig. 2, and Fig. 5 is an elevational view of a portion of the bulkhead wall of Fig. 1, at the outer side thereof.

The furnace is indicated generally by the numeral 6 and is provided with down-takes 7 and a bulkhead wall 8. The outer exposed portion of the bulkhead wall 8 is composed of vitrifiable bricks such as silica bricks that are commonly employed in furnace walls. The inner portion of the wall is composed of either highly aluminous bricks, chrome bricks, or magnesite bricks, which are of course more expensive than the outer layer of bricks.

The aluminous bricks can be made of various highly aluminous clays such as diaspore, or may be made of sillimanite, either artificial or natural. The aluminous bricks are highly refractory, resistant to acid slag actions, and of low thermal expansion compared to the silica bricks. Likewise, the chrome bricks are more highly refractory than the silica bricks. I therefore provide an inner wall of highly refractory dense material backed by cheaper vitrifiable brick which will become glazed if the inner wall wears away to such an extent as to expose the outer layer of brick to the furnace gases, and this glaze renders the outer layer of brick more highly resistant to furnace gases. In ordinary practice with the bulkhead wall composed entirely of silica brick or the like, the brick is worn away too rapidly for a glaze to form thereon.

For ordinary basic open hearth furnaces, the facing brick may be either of aluminous or chrome material, but for acid open hearth furnaces, the aluminous material is preferable, because it is more resistant to acids than are chrome and magnesite. Heretofore, silica brick has been employed in acid open hearth furnaces, because the silica is resistant to the acid gases, but as above-explained, the use of silica alone is objectionable because it has short life.

The chrome or aluminous bricks are represented by the numerals 9 and 10, while the silica bricks are represented by the numerals 11, 12 and 13.

In building the wall, a course composed of the aluminous or chrome bricks 10 and the silica bricks 11 and 12 is placed in superposed relation to a course composed of aluminous or chrome bricks 9 and silica bricks 13, the first-mentioned course being shown in plan view in Fig. 3, and the second-named course being shown in plan view in Fig. 4. These courses alternate as indicated more clearly in Fig. 2. As shown more clearly in Fig. 3, appreciable clearance is provided between the silica bricks because they expand to a greater extent than do the chrome or the aluminous bricks, although this expansion will not be so great as ordinarily takes place, because the inner facing bricks shield the silica bricks somewhat from the heat. There will, of course, be slight vertical expansion of the silica bricks, and to take care of this expansion, the aluminous bricks can be made slightly thicker than the silica bricks and cardboard sheets 14 placed between the silica bricks to keep the walls level until after the silica bricks have expanded, the cardboard of course, burning away under the heat which causes expansion of the silica bricks. After expansion of the silica bricks, any clearance spaces provided at their horizontal surfaces and at their inner ends becomes closed by reason of said expansion.

The wall may suitably have an overall thickness of approximately 13½ inches, and it will be seen that substantially half of the wall is composed of the cheaper silica bricks, and the other half of the more expensive highly refractory bricks.

The inner and outer layers of the bricks are interlocked to bind them together, by reason of the larger bricks 10 and 11 which have their inner or nose portions of wedge form and which overlap the courses of smaller bricks 9 and 13. Should the bricks at the inner face of the wall become worn away to such an extent as to expose the silica bricks, a glaze will meanwhile have been formed upon the silica bricks and to a considerable depth therein by vitrification thereof, and this glazed surface is highly resistant to the action of furnace gases. If desired, the bulkhead wall could be patched with ordinary silica brick and it would still be less expensive than a regular chrome bulkhead.

A wall constructed according to my invention need be of no greater overall dimensions than the usual type of furnace walls, such as the bulkhead walls, and may therefore be embodied in the present types of furnaces, without change of the ironwork, etc.

I claim as my invention:—

1. A furnace wall having an outer portion built up of refractory bricks and an inner portion of refractory bricks which have a coefficient of expansion different than that of the said bricks of the outer portion, and portions of certain of the inner bricks being disposed in superposed relation to adjacent portions of the outer bricks, and combustible spacing elements interposed between the horizontal faces of the more greatly expansible bricks, and also between the said superposed portions.

2. A furnace wall having an outer portion built up of refractory bricks and an inner portion of refractory bricks which have a coefficient of expansion less than that of the said bricks in the outer portion, the inner bricks being initially of greater vertical dimension than the outer bricks, and portions of certain of the inner bricks being disposed in superposed relation to adjacent portions of certain outer bricks, and spacing elements interposed between the horizontal faces of the outer bricks and also between said superposed adjacent portions, the said elements being readily disintegrable under furnace temperatures.

JAMES E. MacDONALD.